United States Patent [19]

Nakayama et al.

[11] 4,031,262

[45] June 21, 1977

[54] ICE CREAM AND THE PROCESS FOR MAKING SAME

[75] Inventors: Michio Nakayama; Setuko Nakayama, both of Hirakata, Japan

[73] Assignees: Eigo Tojo; Sadao Nakayama, both of Japan

[22] Filed: July 13, 1976

[21] Appl. No.: 704,930

[30] Foreign Application Priority Data

July 18, 1975  Japan .............................. 50-88516
July 18, 1975  Japan ....................... 50-101802[U]

[52] U.S. Cl. ................................ 426/565; 426/583
[51] Int. Cl.² ...................... A23G 9/00; A23G 9/04
[58] Field of Search ........................... 426/565, 566

[56] References Cited

UNITED STATES PATENTS

| | | | |
|---|---|---|---|
| 1,228,152 | 5/1917 | Wieda | 426/565 |
| 2,139,836 | 12/1938 | London | 426/565 |
| 2,423,600 | 7/1947 | Landers | 426/566 |
| 3,403,031 | 9/1968 | Holmes | 426/565 |

*Primary Examiner*—Jeanette M. Hunter
*Attorney, Agent, or Firm*—Wenderoth, Lind & Ponack

[57] ABSTRACT

This invention provides an ice cream scattered with ice granules to provide more cooling and refreshing aftertaste. The ice granules mixed may contain various kinds of food additives or alcoholic beverage.

16 Claims, No Drawings

ICE CREAM AND THE PROCESS FOR MAKING SAME

The present invention relates generally to a novel ice cream, and more particularly, ice cream containing ice granules and the process for making the same.

Conventionally, ice cream and the like containing oil or fat are manufactured by mixing oil or fat, milk, sugar, flavorings, and in some cases, egg with water, emulsifying the ice cream mix, cooling while stirring to provide an overrun by incorporation of air, and freezing. Such conventional ice cream and the like had the shortcoming of leaving a rather unrefreshing or unpleasant aftertaste. After eating, a glass of water or juice is desired to remove the aftertaste.

It is an object of the present invention to provide ice cream and the like which have more cooling or refreshing effect and more pleasant aftertaste.

The present invention provides ice cream and the like having scattered or admixed ice granules of about 1–1,000 mm$^3$ in size in the amount of about 5–50 volume percent.

In another aspect, the present invention relates to a process for making such ice cream and the like comprising the steps of preparing the conventional soft ice cream and such ice granules as mentioned above, mixing them together so as for the content of ice granules to be about 5–50 volume percent, and freezing the mixture.

The term "ice cream and the like" used in the present invention includes not only what is technically termed ice cream but also other similar frozen creams containing oil or fat produced by the aforesaid process.

The term "soft ice cream" means the conventional ice cream mix cooled to below zero while stirring to provide an overrun but not yet frozen to lower temperatures, say, −30° C. Such soft ice cream used in this invention has an oil and fat content of preferably more than 1 percent.

The ice granules or chips may be circular or rectangular in shape and may be made by breaking ice blocks into pieces with a hammer or the like, by spraying water into a supercooled chamber, or by spraying supercooled water into a chamber at normal temperature.

The ice granules used are of a low temperature, preferably about −30° C. The size of ice granules is about 1–1,000 mm$^3$, preferably 6–350 mm$^3$. We have proved that too tiny ice granules of less than 1 mm$^3$ do not have a sufficient cooling effect and are hard to make and might destroy emulsification. On the other hand, too large ice granules of over 1,000 mm$^3$ would be incompatible with ice cream.

The content of ice granules is about 5–50 volume percent, preferably 10–30 percent. It has been proved that too small amount of ice granules, say, less than 5 volume percent, does not give a sufficient cooling flavor. Conversely, ice cream containing more than 50 volume percent of ice granules would not have the characteristics of ice cream any longer.

Ice granules may be made from water flavored with one or more additives such as fruit juice or the like, fermented milk, sweetenings, flavorings, edible colors, spices, and edible acids. An important advantage of the present invention is that it has become possible to add to ice cream ethyl alcohol or an alcoholic beverage such as whisky or brandy by using ice granules containing such a material. Such an addition was heretofore impossible because they would decompose oil and fat and condense proteins. Such additives form attractive combinations with ice cream and give it novel taste appeal.

The following examples, which are merely illustrative, will show how the process of the present invention may be practised.

The following two kinds of soft ice creams A and B and three kinds of ice granules C, D and E were prepared. Unless otherwise stated, quantities are expressed as parts by weight.

A. Eight parts of milk fat, 8 parts of skim powdered milk, 10 parts of sucrose, 10 parts of starch syrup, 63.4 parts of water, 0.3 part of emulsifier, and 0.3 part of stabilizer were used to prepare an emulsified ice cream mix in known manner. The mix was cooled to about −4° C by means of a freezer to make soft ice cream with an overrun of 90.

B. Five parts of palm oil, 5 parts of skim powdered milk, 10 parts of sucrose, 10 parts of starch syrup, 69.4 parts of water, 0.3 part of emulsifier and 0.3 part of stabilizer were used to make soft ice cream with an overrun of 90 in the same manner as for (A).

C. An ice block was broken into pieces with a hammer. The ice pieces made were sieved first with a sieve with meshes of 9 mm$^2$ and then with meshes of 49 mm$^2$. The pieces which did not pass through the former sieve and passed through the latter were collected and frozen to −30° C.

D. Three parts of sucrose, a small amount of saccharin, 0.1 part of orange essence, 0.3 part of citric acid and 10 parts of fruit juice were put in about 86.6 parts of water. The mixture was frozen to ice, which was broken into pieces with a hammer. The pieces were sieved in the same manner as for (C) and frozen to −30° C.

E. Three parts of brandy was put in 97 parts of water and the mixture was frozen. The resultant ice was broken, sieved and frozen to −30° C in the same manner as for (C).

EXAMPLE 1

85 parts of soft ice cream (A) was mixed with 15 parts of ice granules (C) and the mixture was frozen to −30° C.

EXAMPLE 2

85 parts of soft ice cream (B) was mixed with 15 parts of ice granules (D) and the mixture was frozen to −30° C.

EXAMPLE 3

85 parts of soft ice cream (A) was mixed with 15 parts of ice granules (E) and the mixture was frozen to −30° C.

As controls, soft ice creams (A) and (B) were frozen to −30° C without mixing with any ice granules.

As a result of a sampling test in which 20 persons tried these Examples and the controls, 17 of them felt any Examples more delicious then the controls and all of them admitted that any Examples had much better aftertastes than the controls.

Minor changes may be made in the embodiments of the present invention or in the process without departing from the spirit of the invention.

What is claimed is:

1. A process for making ice cream which comprises admixing soft ice cream and ice granules of about 1–350 mm$^3$ in size, in a ratio such that the content of ice granules is about 5–30 volume percent, and freezing the mixture.

2. A process for making ice cream as claimed in claim 1 wherein the size of said ice granules is about 6–350 mm$^3$.

3. A process for making ice cream as claimed in claim 1 wherein the content of said ice granules is about 10–30 volume percent.

4. A process for making ice cream as claimed in claim 1 wherein said ice granules contain at least one food additive selected from the group consisting of fruit juice or the like, fermented milk, and edible acids.

5. A process for making ice cream as claimed in claim 1 wherein said ice granules contain ethyl alcohol.

6. A process for making ice cream as claim in claim 1 wherein said ice granules contain an alcoholic beverage.

7. A process according to claim 1, wherein said ice cream comprises milk fat.

8. A process according to claim 1, wherein said ice cream comprises skim powdered milk.

9. Ice cream prepared by the process of claim 1.

10. Ice cream prepared by the process of claim 2.

11. Ice cream prepared by the process of claim 3.

12. Ice cream prepared by the process of claim 4.

13. Ice cream prepared by the process of claim 5.

14. Ice cream prepared by the process of claim 6.

15. Ice cream according to claim 9, wherein said ice cream comprises milk fat.

16. Ice cream according to claim 9 wherein said ice cream comprises skim powdered milk.

* * * * *